(12) United States Patent
Saintignan

(10) Patent No.: US 12,006,057 B2
(45) Date of Patent: Jun. 11, 2024

(54) FUEL SYSTEM WITH ECOLOGY FUNCTION

(71) Applicant: PRATT & WHITNEY CANADA CORP., Longueuil (CA)

(72) Inventor: Cédric Saintignan, Boucherville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 110 days.

(21) Appl. No.: 17/475,440

(22) Filed: Sep. 15, 2021

(65) Prior Publication Data
US 2023/0079646 A1    Mar. 16, 2023

(51) Int. Cl.
*B64D 37/00* (2006.01)
*F02C 7/22* (2006.01)
*F02C 9/26* (2006.01)

(52) U.S. Cl.
CPC .............. *B64D 37/00* (2013.01); *F02C 7/222* (2013.01); *F02C 9/263* (2013.01); *F05D 2220/323* (2013.01); *F05D 2240/35* (2013.01)

(58) Field of Classification Search
None
See application file for complete search history.

(56) References Cited

U.S. PATENT DOCUMENTS

| | | | |
|---|---|---|---|
| 3,339,574 A | 9/1967 | Erb et al. | |
| 3,841,089 A * | 10/1974 | Clark | F02C 9/26 137/202 |
| 6,195,978 B1 | 3/2001 | Futa, Jr. | |
| 6,334,296 B2 | 1/2002 | Futa, Jr. et al. | |
| 8,122,699 B2 | 2/2012 | Lawrence et al. | |
| 10,982,858 B2 | 4/2021 | Bickley | |
| 2004/0217203 A1 * | 11/2004 | Walti | B05B 1/3426 239/492 |
| 2005/0279079 A1 * | 12/2005 | Baryshnikov | F02C 7/232 60/39.094 |
| 2008/0028742 A1 * | 2/2008 | Parsons | F02C 9/30 60/734 |
| 2010/0037612 A1 * | 2/2010 | Futa | F02C 7/228 60/734 |

(Continued)

FOREIGN PATENT DOCUMENTS

WO    WO01/16472 A1    3/2001

OTHER PUBLICATIONS

European Search report issued in counterpart application No. 22195906.7 dated Feb. 10, 2023.

*Primary Examiner* — Edwin Kang
(74) *Attorney, Agent, or Firm* — NORTON ROSE FULBRIGHT CANADA LLP

(57) ABSTRACT

A fuel system for an aircraft engine comprises a fuel metering unit and a separate flow divider. The flow divider has an inlet port fluidly connected to the fuel metering unit via a fuel line. A primary and a secondary fuel manifold are fluidly connected to the flow divider. The fuel metering unit and the flow divider have a fuel supply mode in which fuel is allowed to flow in a first direction through the fuel line from the fuel metering unit to the flow divider to feed the primary and secondary fuel manifolds, and an ecology mode in which fuel is allowed to flow in a second direction through the same fuel line from the flow divider towards the fuel metering unit. A same fuel line is thus used as a fuel supply line and an ecology line.

17 Claims, 3 Drawing Sheets

(56) References Cited

U.S. PATENT DOCUMENTS

| | | | |
|---|---|---|---|
| 2012/0138172 A1* | 6/2012 | Curello | F16K 31/126 137/511 |
| 2013/0341430 A1* | 12/2013 | Hall | F02M 61/167 239/533.2 |
| 2016/0076452 A1 | 3/2016 | Striker et al. | |
| 2017/0122330 A1* | 5/2017 | Mastro | F04D 29/325 |
| 2018/0355987 A1* | 12/2018 | Stachowiak | F16K 15/044 |

* cited by examiner

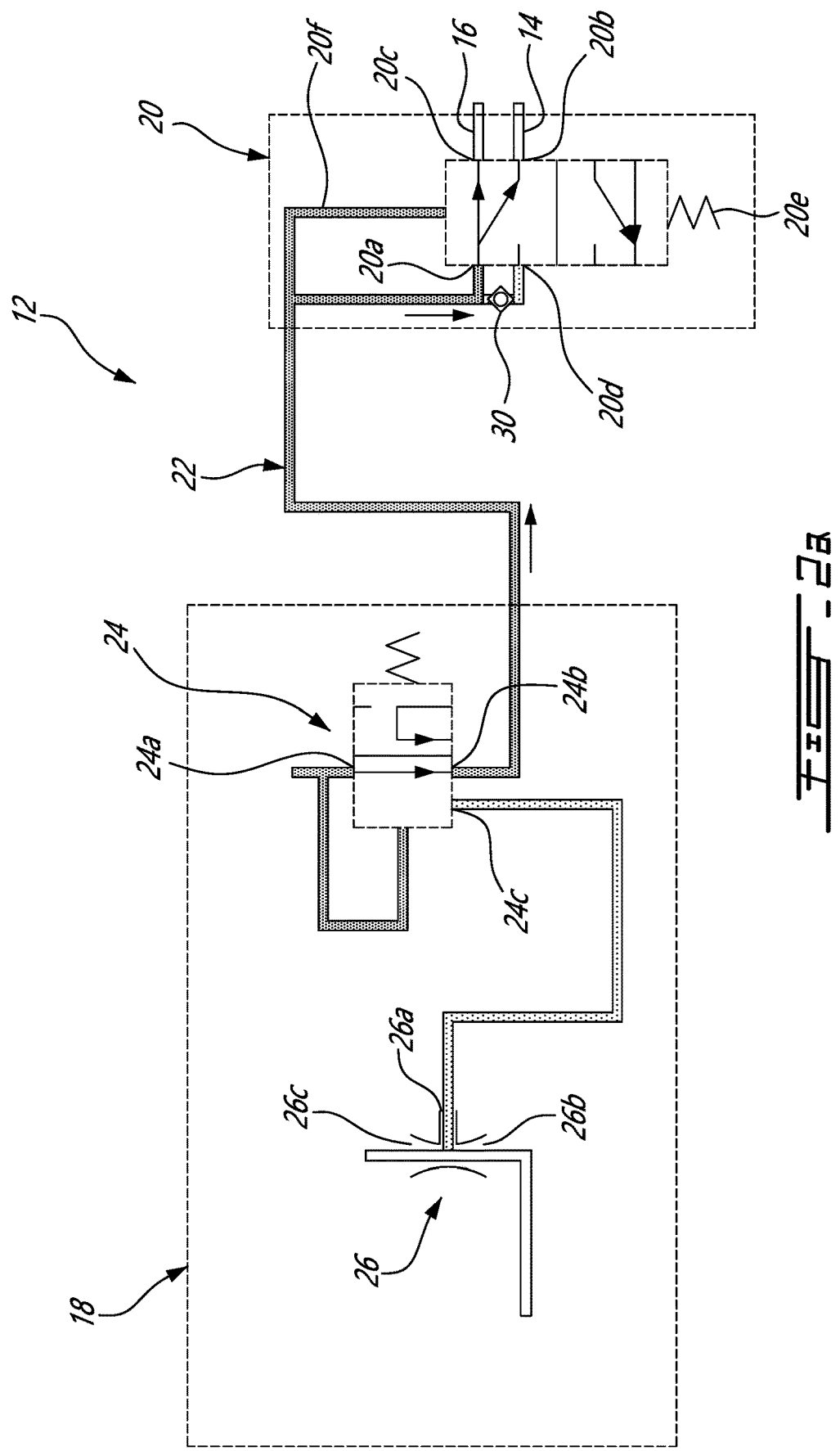

imageFUEL SYSTEM WITH ECOLOGY FUNCTION

TECHNICAL FIELD

The application relates generally to fuel systems and, more particularly, to a fuel system having an ecology mode to drain fuel manifolds at engine shut down.

BACKGROUND OF THE ART

Fuel delivery systems for gas turbine engines sometimes require an ecology function to remove a set quantity of fuel from the engine fuel manifolds after engine shutdown. While ecology systems are known, there is a continued demand for the provision of a compact, economical ecology function for fuel supply systems.

SUMMARY

In one aspect, there is provided a fuel system for an aircraft engine, comprising: a fuel metering unit fluidly connectable to a fuel source of the aircraft engine; a flow divider separate from the fuel metering unit and mountable to the aircraft engine at a location remote from the fuel metering unit, the flow divider having a fuel inlet port fluidly connected to the fuel metering unit via a fuel line; and a primary and a secondary fuel manifold fluidly connected to the flow divider; wherein the fuel metering unit and the flow divider have a fuel supply mode in which fuel is allowed to flow in a first direction through the fuel line from the fuel metering unit to the flow divider to feed the primary and secondary fuel manifolds, and an ecology mode in which fuel is allowed to flow in a second direction through the fuel line from the flow divider towards the fuel metering unit.

In another aspect, there is provided a fuel system for an aircraft engine, comprising: a fuel metering unit including a discharge pressurizing valve having an inlet port fluidly connectable to a source of fuel, an ecology outlet port fluidly connected to a suction inlet port of an ecology ejector, and an inlet/outlet port selectively connectable in flow communication to either one of the inlet port or the ecology outlet port; a flow divider having an inlet port selectively fluidly connectable to a primary and a secondary fuel manifold, an ecology outlet port selectively fluidly connectable to the primary and secondary fuel manifolds, and a flow restrictor fluidly connected to the ecology outlet port; and a fuel line extending from the inlet/outlet port of the discharge pressurizing valve to the inlet port of the flow divider, the ecology outlet port of the flow divider fluidly connected to the fuel line via the flow restrictor.

In a further aspect, there is provided a fuel system for an aircraft engine, comprising: a fuel metering unit having an inlet port fluidly connectable to a source of fuel; a flow divider having a primary fuel outlet and a secondary fuel outlet respectively fluidly connected to a primary fuel manifold and a secondary fuel manifold; a fuel line fluidly connecting an outlet port of the fuel metering unit to an inlet port of the flow divider; a flow restrictor fluidly connecting an ecology outlet port of the flow divider to the fuel line; and an ecology ejector selectively fluidly connectable to the fuel line.

DESCRIPTION OF THE DRAWINGS

Reference is now made to the accompanying figures in which:

FIG. 2a is a schematic view of the fuel system illustrated in a fuel supply mode for feeding fuel to primary and secondary fuel manifolds via the flow divider.

DETAILED DESCRIPTION

Figure 1:
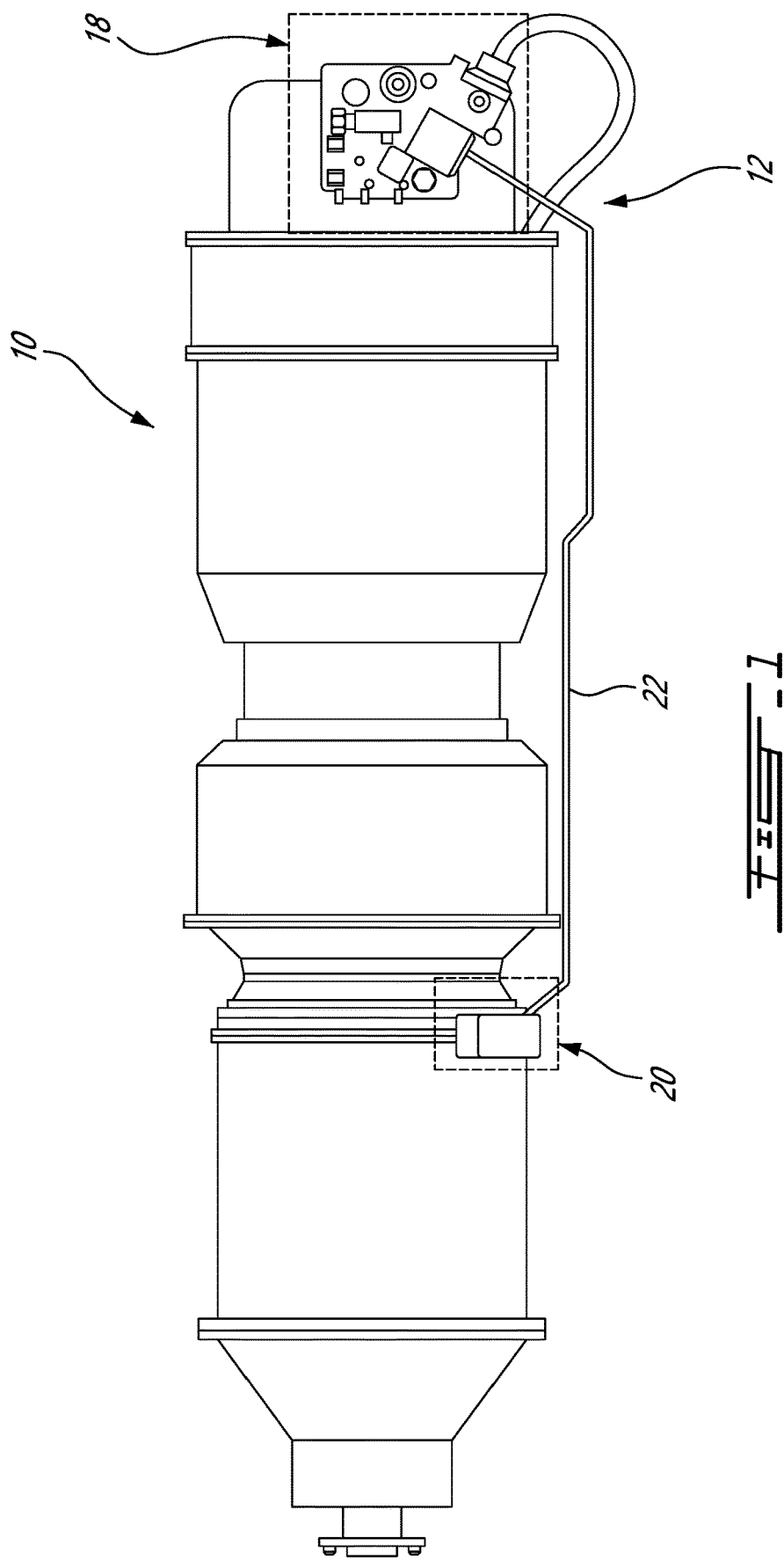
FIG. 1 is a schematic cross-section view of an aircraft engine having a fuel system including a fuel metering unit (FMU) fluidly connected to a separate flow divider via a two-way fuel line.

FIG. 1 illustrates an aircraft engine 10 comprising a fuel system 12 having fuel supply and ecology functions. According to some embodiments, the engine 10 is provided in the form of a gas turbine engine configured for use in subsonic flight, and generally comprising a compressor section for pressurizing the air, a combustor in which the compressed air is mixed with fuel and ignited for generating an annular stream of hot combustion gases, and a turbine section for extracting energy from the combustion gases. However, it is understood that the engine 10 can adopt various forms and is, thus, not strictly limited to gas turbine engines. For instance, the engine 10 could be provided in the form of a hybrid electric aircraft engine or a compounded engine including an internal combustion engine compounding power with a gas turbine engine.

Figure 2B:
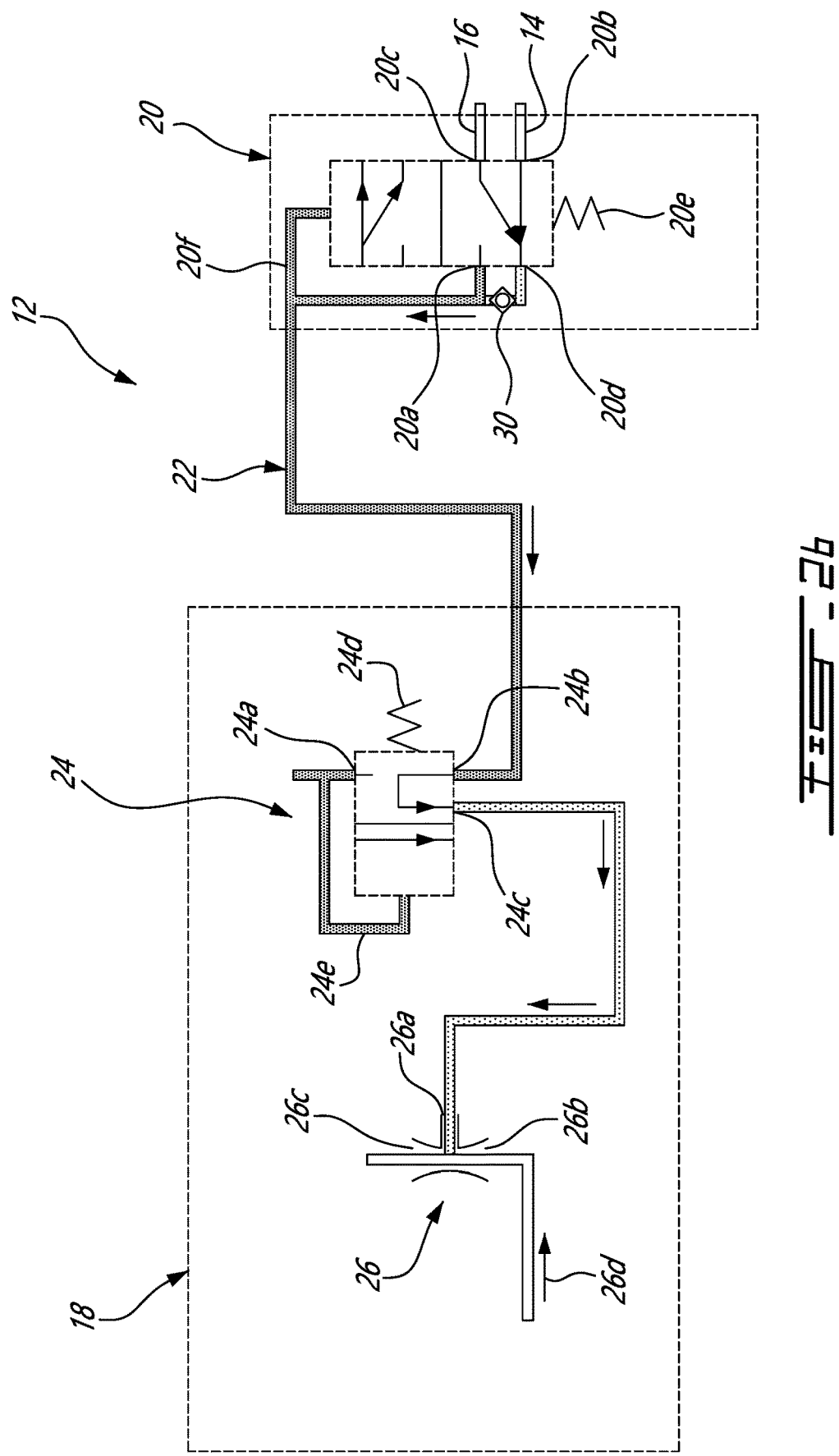
FIG. 2b is a schematic view of the fuel system illustrated in an ecology mode for draining the primary and secondary fuel manifolds at engine shut down.

The fuel system 12 of the engine 10 generally comprises a fuel metering unit (FMU) 18 fluidly connected to a flow divider 20 configured to split the fuel flow from the FMU 18 between a primary and a secondary fuel manifold 14, 16 (FIGS. 2a and 2b). As will be seen hereinafter, the FMU 18 and the flow divider 20 cooperate to sequence and schedule the fuel flow between the primary and secondary fuel manifolds 14, 16. The term "fluidly connected" as used herein is intended to mean either an indirect or a direct fluid communication. Thus, if a first device fluidly connects to a second device, that connection may be through a direct connection or through an indirect connection via other devices and connections.

According to the illustrated embodiment, the FMU 18 and the flow divider 20 are two separate units installed at remote locations along the engine 10. As exemplified in FIG. 1, the FMU 18 can be installed at the rear end of the engine 10, whereas the flow divider 20 may be disposed adjacent the fuel manifolds 14, 16 in the combustor section of the engine 10. The FMU 18 is fluidly connected to the flow divider 20 via a single fuel line 22. As will be seen hereinafter, the fuel line 22 is used to both supply fuel to the fuel manifolds 14, 16 during engine operation and to withdraw fuel from the manifolds 14, 16 at engine shutdown. In other words, the same fuel line 22 is selectively used as a fuel supply line (FIG. 2a) and an ecology line (FIG. 2b). As exemplified in FIG. 1, the fuel line 22 may be provided in the form of an external line extending along a length of the engine 10 between the FMU 18 and the flow divider 20. It is understood that the fuel line 22 can include various components, such as conduit sections, pipes, hoses, fittings, connectors, etc., for carrying a fuel flow from one location to another.

Referring to FIGS. 2a and 2b, it can be appreciated that the FMU 18 comprises a discharge pressurizing valve 24 and an ecology ejector 26. According to the illustrated embodiment, the discharge pressurizing valve 24 is embodied in the form of a 3-way, 2-position directional control valve having a pressure or inlet port 24a, an inlet/outlet port 24b and an ecology outlet port 24c. The inlet port 24a is fluidly connected to a fuel source, such as the engine fuel tank (not shown) via one or more fuel pumps (not shown). The inlet/outlet port 24b is, in turn, fluidly connected to the fluid line 22. And the ecology port 24c is fluidly connected to a suction inlet port 26a of the ecology ejector 26. As depicted in FIG. 2a, in the first position (i.e. the fuel supply mode), the inlet port 24a is fluidly connected to the inlet/outlet port 24b and the ecology port 24c is disabled/closed. In the second position (i.e. the ecology mode) shown in FIG. 2b, the inlet/outlet port 24b is fluidly connected to ecology outlet port 24c and the inlet port 24a is closed. A translating spool or the like may serve as the valve member and determines the position that the valve is in. As schematically illustrated in FIGS. 2a and 2b, the valve member/spool may be biased towards the second position by a biasing member 24d (e.g. a spring or a hydraulic/pneumatic member). Alternatively, the valve member/spool may be electric or electronically controlled, like a solenoid. As schematically shown at 24e, the valve member may also be fluidly connected to the pressure side of the valve 24 so that when the pressure at the inlet port 24a reaches a predetermined value sufficient to overcome the biasing force of the biasing member 24d, the valve member is hydraulically pushed against the biasing member 24d to the first position illustrated in FIG. 2a. At engine shutdown, the fuel pump is stopped, the pressure acting on the valve member thus drop, and the biasing member 24d returns the valve member to its second position as shown in FIG. 2b, thereby fluidly connecting the fuel line 22 to the ejector 26.

In addition to the suction inlet port 26a, the ecology ejector 26 has a motive flow inlet 26b fluidly connected to a high pressure motive fluid source (i.e. pressurized fuel) and a discharge or outlet port 26c fluidly connected to a fuel tank, such as the engine main fuel tank. As shown in FIG. 2b, following engine shutdown, the motive flow 26d flowing through the motive flow inlet 26b creates a suction at the suction inlet port 26a to draw fuel from the manifolds 14,16, via the flow divider 20, the fuel line 22 and the discharge pressurizing valve 24.

Still referring to FIGS. 2a and 2b, it can be appreciated that according to some embodiments, the flow divider 20 comprises a 4-way, 2-position valve having an inlet port 20a, a primary fuel port 20b, a secondary fuel port 20c, and an ecology outlet port 20d. The inlet port 20a is fluidly connected to the fuel line 22. The primary fuel port 20b and the secondary fuel port 20c are respectively fluidly connected to the primary and secondary fuel manifolds 14, 16. The ecology outlet port 20d is, in turn, fluidly connected to the fuel line 22 via a flow restrictor 30, which can form part of the flow divider 20. According to the illustrated embodiment, the flow restrictor 30 is provided in the form of a one-way valve or check valve configured to allow fuel flow from the ecology outlet port 20d towards the FMU 18 and to block fuel flow from the fuel line 22 to the ecology outlet port 20d. It is understood that the flow restrictor 30 could consist of various forms of valves including active valves, switch valves, on/off control valves, 3-way valves just to name a few.

Instead of a valve, in some applications, the flow restrictor 30 could be embodied in the form of a passive restrictor like an orifice defining a throat/restricted orifice or a Tesla valve or a similar flow restrictor that would allow sufficiently low (acceptable) fluid resistance in the ecology direction (FIG. 2b) to empty the manifolds 14, 16, and sufficiently high (acceptable) fluid resistance in the normal operating direction (FIG. 2a) to force the flow divider valve to move to the first position (i.e. the fuel supply mode). According to these alternatives, the sealing once ecology is done would not be provided, but could be regarded as optional.

As shown in FIG. 2a, when the divider valve is in its first position (i.e. the fuel supply mode), the inlet port 20a is fluidly connected to both the primary and secondary fuel ports 20b, 20c to split the incoming fuel flow according to a predetermined ratio between the primary and secondary fuel manifolds 14, 16. It is understood that the divider valve can have an infinite number of intermediate positions between open to primary only, and fully open to primary and secondary. In the second position (i.e. ecology mode) shown in FIG. 2b, the primary and secondary fuel ports 20b, 20c are rather fluidly connected to the ecology outlet port 20d to permit drainage of the fuel manifolds 14, 16 after the engine has been shut down or during the process of shutting down the engine, or as the engine spools down following a commanded engine shutdown. In an alternative configuration, only a selected one of the two manifolds 14, 16 could be emptied by the system. Accordingly, the second position or an intermediate position could be used to selectively connect one or both fuel manifolds to the ecology port 20d. A translating spool or the like may serve as the valve member and determines the position that the divider valve is in. As schematically illustrated in FIGS. 2a and 2b, the valve member/spool may be biased towards the second position (FIG. 2b) by a biasing member 20e (e.g. a spring, a hydraulic/pneumatic member or a solenoid). As schematically shown at 20f, the valve member may also be fluidly connected to the pressure side of the divider valve so that when the pressure at the inlet port 20a reaches a predetermined value sufficient to overcome a biasing force of the biasing member 20e, the valve member is hydraulically pushed against the biasing member 20e to the first or open position illustrated in FIG. 2a. At engine shutdown, the fuel pump is stopped, the pressure acting on the valve member thus drops, and the biasing member 20e returns the valve member to its second or closed position as shown in FIG. 2b, thereby fluidly connecting the fuel manifolds 14 and 16 to the ejector 26 via the flow divider valve, the fuel line 22 and the discharge pressurizing valve 24.

As shown in FIG. 2a, during engine operation, the fuel system 12 is in a fuel supply mode for supplying fuel to the primary and secondary fuel manifolds 14, 16. In this mode, fuel pressure in the system maintains the discharge pressuring valve 24 and the flow divider valve 20 in their first or open position. As depicted by the flow arrows in FIG. 2a, in this mode of operation, fuel is allowed to flow from the discharge pressuring valve 24 through the fuel line 22 and the inlet port 20a of the flow divider 20 to the primary and secondary fuel manifolds 14, 16. The manifolds 14,16 feed respective groups of primary and secondary fuel nozzles (not shown) disposed for injecting fuel in the combustion chamber (not shown) of the engine 10. The primary fuel flow may be used to initiate the combustion process during engine start-up, while the secondary fuel flow may be used to supplement and intensify the combustion process once the primary flow is burning steadily.

In the fuel supply mode of the fuel system 12, the ecology port 24c of the discharge pressurizing valve 24 is closed, thereby disconnecting the ecology ejector 26 from the fuel line 22. Fuel flow through the ecology port 20d of the flow divider 20 is prevented by the flow restrictor 30 (the check valve in the illustrated embodiment).

At engine shutdown, operation of the fuel pump is terminated, thereby causing the fuel pressure in the system to drop. This causes the fuel system 12 to fall into its ecology mode for draining the fuel manifolds 14,16. The drop in fluid pressure in the system causes the discharge pressuring valve 24 and the flow divider 20 to close as illustrated in FIG. 2b. In this second or closed position, the fuel manifolds 14, 16 are fluidly connected to the ecology port 20d of the flow divider 20 and the fuel line 22 is fluidly connected to the ecology ejector 26 via the ecology port 24c of the discharge pressurizing valve 24. A motive flow 26d through the ejector 26 is used to entrain an ecology flow through the fuel line 22 to drain the fuel manifolds 14, 16. In the ecology mode, fuel is thus allowed to flow from the fuel manifolds 14, 16 through the ecology port 20d of the flow divider 20, the flow restrictor 30 (e.g. the check valve), the fuel line 22, the ecology port 24c of the discharge pressuring valve 24 and to the suction inlet port 26a of the ejector 26 where the fuel withdrawn from the manifolds 14, 16 is discharged at 26c into a tank or the like.

In view of the foregoing, it can be appreciated that a single fluid line 22 can be used to both supply fuel to and withdraw fuel from the manifolds 14, 16. It eliminates the need for a dedicated ecology line between the FMU 18 and the flow divider 20. This is particularly advantageous when the flow divider 20 and the FMU 18 are located at spaced-apart locations along the engine 10. It reduces part counts, weight and facilitate assembly.

According to some embodiments, the FMU 18 may further comprise a check valve or the like for preventing the fuel to backflow from the ecology ejector 26 in the ecology mode. Such a check valve could be installed in a line between the suction inlet 26a of the ejector 26 and the ecology port 24c of the discharge pressurizing valve 24.

Under certain conditions, if the performance of the ecology system is too good, the fuel line 22 between the FMU 18 and the flow divider 20 (also used for ecology) could be fully emptied during the ecology sequence. The consequence is that the fuel line 22 would have to be refilled with fuel during the next engine start, which makes it more difficult to start the engine, the fuel pump capacity at start being limited. To avoid oversizing the fuel pump, the FMU 18 could be operated by a suitable control system to send fuel to the engine at the very beginning of the start procedure, or as early as the pump bearings can support a sufficient load. In addition, the ecology system could be configured to ensure that the fuel line 22 is not completely emptied during ecology.

According to other embodiments, instead of integrating an ecology function to the discharge pressuring valve 24, a separate ecology valve could be provided in the FMU 18 to selectively fluidly connect the ecology ejector 26 to the fuel line 22.

According to at least some embodiments, the discharge pressurizing valve and/or the flow divider valve could be controlled to switch to the ecology mode electronically instead of hydraulically.

According to one embodiment or more, suction is not needed to draw the fuel out of the manifolds at engine shutdown because the fuel lines are such that gravity combined (or not) with the residual air/gas pressure in the engine combustor as the engine spools down are sufficient to push the fuel contained in the manifolds back through the flow divider, the fuel line, the discharge pressurizing valve to the port 26b. The port 26b could be directly connected to the aircraft fuel tank or like, or any other low pressure point in the fuel system.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. A fuel system for an aircraft engine, comprising:
   a fuel metering unit fluidly connectable to a fuel source of the aircraft engine;
   a flow divider separate from the fuel metering unit and mountable to the aircraft engine at a location remote from the fuel metering unit, the flow divider having a fuel inlet port and a fuel ecology outlet port;
   a fuel line fluidly connecting the fuel metering unit to the flow divider, the fuel line including a conduit segment extending from the fuel metering unit to the flow divider, the conduit segment fluidly connected to both the fuel inlet port and the fuel ecology outlet port;
   a flow restrictor between the fuel ecology outlet port and the conduit segment:
   a primary and a secondary fuel manifold selectively fluidly connectable to the fuel inlet port and the fuel ecology outlet port of the flow divider;
   wherein the fuel metering unit and the flow divider have a fuel supply mode in which fuel is allowed to flow in a first direction through the conduit segment of the fuel line from the fuel metering unit to the fuel inlet port of the flow divider to feed the primary and secondary fuel manifolds, and an ecology mode in which the fuel is allowed to flow in a second direction opposite to the first direction through the conduit segment of the fuel line from the fuel ecology outlet port of the flow divider to the fuel metering unit, and
   wherein the flow restrictor is operable to block fuel flow in the first direction from the conduit segment to the fuel ecology outlet port of the flow divider and allow the fuel flow in the second direction from the fuel ecology outlet port to the conduit segment of the fuel line.

2. The fuel system as defined in claim 1, wherein the fuel ecology outlet port is fluidly connected to the primary and secondary fuel manifolds when the flow divider is in the ecology mode.

3. The fuel system as defined in claim 2, wherein the flow restrictor includes a check valve.

4. The fuel system as defined in claim 1, wherein the fuel metering unit has an ecology ejector, the ecology ejector having a suction inlet port selectively connectable in flow communication to the conduit segment of the fuel line to withdraw the fuel from the primary and secondary fuel manifolds.

5. The fuel system as defined in claim 4, wherein the fuel metering unit further comprises a discharge pressurizing valve, the ecology ejector selectively connectable to the conduit segment of the fuel line via the discharge pressurizing valve.

6. The fuel system as defined in claim 5, wherein the discharge pressurizing valve has an ecology outlet port selectively fluidly connectable to the conduit segment of the fuel line.

7. The fuel system as defined in claim 5, wherein the discharge pressurizing valve has an inlet port fluidly connectable to the fuel source, an ecology outlet port fluidly connected to the suction inlet port of the ecology ejector, and an inlet/outlet port selectively connectable in flow communication via the conduit segment to either one of the fuel inlet port or the fuel ecology outlet port.

8. The fuel system as defined in claim 1,
   wherein the fuel metering unit includes a discharge pressurizing valve having an inlet port fluidly connectable to the fuel source, an ecology outlet port fluidly connected to a suction inlet port of an ecology ejector, and an inlet/outlet port selectively connectable in flow communication to either one of the fuel inlet port or the fuel ecology outlet port; and wherein the conduit segment extends from the inlet/outlet port of the discharge pressurizing valve to the fuel inlet port of the flow divider, the fuel ecology outlet port of the flow divider fluidly connected to the suction inlet port of the ecology ejector via the flow restrictor, the conduit segment, and the discharge pressurizing valve.

9. The fuel system as defined in claim 8, wherein the flow restrictor is a check valve mounted between the conduit segment of the fuel line and the fuel ecology outlet port of the flow divider.

10. The fuel system as defined in claim 9, wherein the check valve is configured to block the fuel flow from the conduit segment of the fuel line to the fuel ecology outlet port.

11. The fuel system as defined in claim 8, wherein the flow restrictor is a passive flow restrictor.

12. The fuel system as defined in claim 8, wherein the discharge pressurizing valve is a 3-way, 2-position valve having a first position in which the inlet port of the discharge pressurizing valve is fluidly connected to the inlet/outlet port and the ecology outlet port of the discharge pressurizing valve is closed, and a second position in which the inlet port of the discharge pressurizing valve is closed and the inlet/outlet port is fluidly connected to the ecology outlet port of the discharge pressurizing valve.

13. The fuel system as defined in claim 8, wherein the flow divider includes a 4-way, 2-position valve having a third position in which the fuel inlet port of the flow divider is fluidly connected to the primary and secondary fuel manifolds and the fuel ecology outlet port of the flow divider is closed, and a fourth position in which the fuel inlet port of the flow divider is closed and the fuel ecology outlet port is fluidly connected to the primary and secondary fuel manifolds.

14. The fuel system as defined in claim 8, wherein the discharge pressurizing valve has a first position in which the inlet port is fluidly connected to the inlet/outlet port while the ecology outlet port is closed, and a second position in which the inlet port is closed and the inlet/outlet port is fluidly connected to the ecology outlet port, wherein the flow divider has a third position in which the fuel inlet port is fluidly connected to the primary and secondary fuel manifolds while the fuel ecology outlet port is closed, and a fourth position in which the fuel inlet port is closed while the fuel ecology outlet port is fluidly connected to the primary and secondary fuel manifolds, wherein the discharge pressurizing valve is in the first position when the flow divider is in the third position, and wherein the discharge pressurizing valve is in the second position when the flow divider is in the fourth position.

15. The fuel system as defined in claim 8, wherein the fuel line is an external fuel line configured to be mounted outside of the aircraft engine.

16. The fuel system as defined in claim 8, wherein the flow restrictor is a tesla valve.

17. The fuel system as defined in claim 8, wherein the flow divider is positioned adjacent to the primary and secondary fuel manifolds.

* * * * *